United States Patent [19]

Koyama et al.

[11] Patent Number: 6,038,364

[45] Date of Patent: *Mar. 14, 2000

[54] VIDEO SYSTEM HAVING MODE CHANGEOVER RESPONSIVELY TO MOVEMENT OF OBJECT OR MOVEMENT IN OBJECT IMAGE SIGNAL

[75] Inventors: Shinichi Koyama, Tokyo; Shinichi Hatae, Kanagawa-ken, both of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/339,396

[22] Filed: Nov. 14, 1994

[30] Foreign Application Priority Data

Nov. 16, 1993 [JP] Japan ..................................... 5-286537
Nov. 16, 1993 [JP] Japan ..................................... 5-286538

[51] Int. Cl.[7] .................................................. H04N 5/76
[52] U.S. Cl. .............................. 386/46; 386/107; 358/906
[58] Field of Search ..................................... 358/335, 906, 358/310, 340; 360/35.1, 33.1; 348/208, 352, 152, 154, 155; 386/46, 68, 80, 87, 120, 111, 52, 121, 107, 117; H04N 5/76

[56] References Cited

U.S. PATENT DOCUMENTS

| 3,686,434 | 8/1972 | Lemelson | 386/68 |
| 4,511,886 | 4/1985 | Rodriquez | 348/154 |
| 4,694,329 | 9/1987 | Sarabia et al. | 348/630 |
| 4,931,879 | 6/1990 | Koga et al. | 358/335 |
| 5,138,503 | 8/1992 | Nishida | 360/35.1 |
| 5,191,419 | 3/1993 | Wischermann | 348/620 |
| 5,249,065 | 9/1993 | Juso et al. | 358/335 |
| 5,384,595 | 1/1995 | Sakaguchi | 348/208 |
| 5,510,830 | 4/1996 | Ohira | 348/36 |

FOREIGN PATENT DOCUMENTS

63-36687 2/1988 Japan .

*Primary Examiner*—Huy Nguyen
*Attorney, Agent, or Firm*—Robin, Blecker & Daley

[57] ABSTRACT

A recording apparatus is provided with a motion detecting part for detecting a motion of a video image on the basis of a video signal to be recorded, a recording part for recording the video signal on a recording medium, and a control part for controlling the recording action of the recording part according to the detection output of the motion detecting part.

14 Claims, 15 Drawing Sheets

VIDEO SYSTEM HAVING MODE CHANGEOVER RESPONSIVELY TO MOVEMENT OF OBJECT OR MOVEMENT IN OBJECT IMAGE SIGNAL

BACKGROUND OF THE INVENTION

1. Field of the Invention

This invention relates to a video system arranged to pick up and record video images on a recording medium such as a magnetic tape or the like and to reproduce the recorded video images.

2. Description of the Related Art

FIG. 1 shows in a block diagram the recording system of the conventional camera-integrated type video tape recorder (hereinafter referred to simply as VTR).

In FIG. 1, a reference numeral denotes a video camera 1. A camera signal processing circuit 2 is arranged to process the output of the video camera 1. A numeral 3 denotes an amplifier 3 for a recording head 4. Although the recording head 4 is shown separately from a rotary drum 6 in the illustration, the recording head 4 is mounted on the rotary drum 6 in a position where a magnetic tape 5 is in contact with the head 4. The magnetic tape 5 is wrapped around the rotary drum 6.

A drum motor 7 is arranged to rotate the rotary drum 6. A capstan motor 8 is arranged to move the magnetic tape 5. A servo circuit 9 is arranged to control the drum motor 7 and the capstan motor 8. Although a reproducing head 10 is shown separately from the rotary drum 6 in the illustration, the reproducing head 10 is, in actuality, mounted on the rotary drum 6 also in a position where the magnetic tape 5 is in contact with the head 10.

A reproduction amplifier 11 is arranged to amplify the reproduction output of the reproducing head 10. A video signal processing circuit 12 is arranged to process a reproduced signal. A video output terminal 13 is provided for outputting a video signal to a monitor which is not shown. A system control circuit 14 is arranged to control the whole system. An input key part 15 is arranged to permit the operator to input an instruction for a desired operation mode.

A shooting operation is performed as follows. The operator first pushes a recording start key (or a shooting key) which is included in the input key part 15 for picking up a video image. The video image thus picked up by the video camera 1 is outputted in the form of an electrical signal. At the camera signal processing circuit 2, luminance and chrominance information is formed and outputted as a video signal. The level of the video signal is adjusted by the recording head amplifier 3. After the level adjustment, the video signal is recorded on the magnetic tape 5 through the recording head 4 mounted on the rotary drum 6.

In this instance, the control system of the VTR operates as follows: The input key part 15 informs the system control circuit 14 of the pushing operation on the recording start key. The system control circuit 14 then instructs the servo circuit 9 to act in a recording mode. In response to the instruction, the servo circuit 9 causes the drum motor 7 and the capstan motor 8 to rotate. The servo circuit 9 measures drum FG pulses which indicate the rotational frequency of the drum motor 7 (hereinafter referred to as DFG pulses) and FG pulses which indicate the rotational frequency of the capstan motor 8 (hereinafter referred to as CFG pulses). The drum motor 7 and the capstan motor 8 are controlled by the servo circuit 9 on the basis of the DFG and CFG pulses in such a way as to obtain rotational frequencies desired in the recording mode. The magnetic tape 5 is thus caused to travel at a speed for recording while the signal is recorded on the magnetic tape 5.

As a result of a recent trend of diversifying the functions of VTRs, some of VTRs have come to give special effects, such as an image fading, in processing images. FIG. 2 shows a VTR having the fading function. In this case, the VTR is arranged in the same manner as the arrangement shown in FIG. 1, except that the VTR includes a fading circuit 16 to which the output of the camera signal processing circuit 2 is applied.

With the VTR arranged as shown in FIG. 2, it operates as follows. When the recording start key is pushed, the video signal outputted from the camera signal processing circuit 2 with the luminance and chrominance information formed therein is allowed to pass the fading circuit 16 to be recorded on the magnetic tape 5 through the recording head amplifier 3 and the recording head 4 without being processed by the fading circuit 16 if the fading circuit 16 is in an inoperative state. In this instance, the control system operates in the same manner as in the case of the VTR shown in FIG. 1.

In a case where the operator wishes to bring a shooting operation to a stop while gradually decreasing the picture in a manner called "fade-out", the operator pushes a fade key which is included in the input key part 15. The input key part 15 then informs the system control circuit 14 that the fade key is operated. Upon receipt of this information, the system control circuit 14 instructs the fading circuit 16 to perform a fading action. In accordance with the instruction for fading, the fading circuit 16 causes the video signal to gradually converge to a predetermined value. After the lapse of a period of time required until the output of the fading circuit 16 converges to the predetermined value, the system control circuit 14 sends to the servo circuit 9 an instruction for bringing its recording action to a stop. The servo circuit 9 then causes the drum motor 7 and the capstan motor 8 to stop rotating and the recording operation comes to an end with the fade-out action. If the recording operation is to be resumed, the operator pushes the recording start key. Upon receipt of information on this, the system control circuit 14 instructs the servo circuit 9 to begin its action for commencement of recording.

The reproducing operation of the conventional VTR is described as follows. This description is given on the assumption that a video image recorded on the magnetic tape 5 is picked up by a video system arranged to watch the porch of a family residence.

Referring to FIG. 1 or FIG. 2, the operator pushes a reproduction key of the input key part 15. Then, the system control circuit 14 instructs the servo circuit 9 to act in a reproduction mode. In response to the instruction, the servo circuit 9 causes the drum motor 7 and the capstan motor 8 to rotate and measures or detects the DFG and CFG pulses which indicate the rotational frequencies (rotating speeds) of the motors 7 and 8.

The servo circuit 9 controls the drum motor 7 and the capstan motor 8, according to the DFG and CFG pulses, to have them rotate at the rotational frequencies desired in the reproduction mode. The video signal which is reproduced by the reproducing head 10 is then amplified by the reproduction amplifier 11. The amplified video signal is subjected to a demodulating process, an expanding process, etc., at the video signal processing circuit 12 and is thus converted into a video signal for the image to be displayed by a monitor. The video signal is outputted and supplied to the monitor through the video output terminal 13.

At the beginning of the reproducing operation, only an outside scene showing no one at the porch is usually reproduced. Therefore, the operator pushes a fast feeding key included in the input key part 15 for a fast feeding reproducing action. The system control circuit 14 then instructs the servo circuit 9 to act in a fast feeding reproduction mode. The servo circuit 9 controls the drum motor 7 and the capstan motor 8 to cause them to rotate at high speeds for the fast feeding reproduction.

While watching the video images on display in the fast feeding reproduction mode, the operator again pushes the reproduction key of the input key part 15 to change the fast feeding reproduction mode to a normal reproduction mode for confirmation when some image that shows someone as visiting the house begins to appear. When the visitor disappears, the VTR is again brought into the fast feeding reproduction mode by the operator and the steps of operation are repeated thereafter.

However, in the case of the conventional VTR shown in FIG. 1, if the shooting operation is to be carried out with the video camera or the VTR kept in a state of being fixedly mounted on a tripod and directed toward an object of shooting and waiting for a shooting opportunity, the operator is required to push a shooting key by continuously waiting in the same position.

Further, in a case where a VTR is used as a watch video system for watching a porch or the like, the shooting operation is continuously performed on an object which seldom shows any change. As a result, it has been impossible to carry out recording over a long period of time as the recordable length of the tape is limited.

Further, with the conventional VTR arranged as shown in FIG. 2, in a case where shooting and bringing the shooting to a stop are to be repeated with the VTR continuously directed toward shooting objects in a state of being fixedly mounted on a tripod, the operator is also required to push the fade key by continuously waiting in one and the same position.

Another problem with the conventional VTR lies in that, at the time of reproduction in this instance, the VTR necessitates the operator to alternately push the fast feeding key and the reproduction key. Such a reproducing operation has been very troublesome. Besides, the limited responsive speed of human being causes some time lag before the reproduction key is pushed after the presence of some person is found during the process of fast feeding reproduction. Then the time lag might cause some important scene to pass unnoticed.

SUMMARY OF THE INVENTION

It is an object of this invention to provide a high performance recording apparatus which is capable of simply and reliably recording necessary video images.

Another object of this invention is to provide a high performance reproducing apparatus which is capable of simply and reliably reproducing necessary video images.

A further object of this invention is to provide a high performance image pickup apparatus which is capable of simply and reliably picking up necessary video images.

A still further object of this invention is to provide a high performance video system which is capable of simply and reliably processing necessary video images.

To attain these objects, an embodiment of this invention is arranged to detect by motion detecting means a motion of an image on the basis of a video signal to be recorded, to record the video signal on a recording medium by recording means, and to control by control means a recording action of the recording means according to a detection output of a motion detecting means. The arrangement enables the embodiment to simply and reliably record necessary images on a recording medium and to permit an economical use of the recording medium.

Another embodiment of this invention is provided with motion detecting means for detecting a motion of an image on the basis of a video signal to be recorded, fading means for gradually converging the video signal to a predetermined value, and recording means for recording the video signal passing through the fading means, and is arranged to control by control means an action of the fading means and that of the recording means according to a detection output of the motion detecting means. The arrangement enables the embodiment to simply and reliably record necessary images on a recording medium and to carry out a fading action as necessary.

Still another embodiment of this invention is arranged to detect by motion detecting means a motion of an image on the basis of a video signal reproduced from a recording medium and to control by control means a reproduction mode according to a detection output of the motion detecting means. The arrangement enables the embodiment to simply and reliably reproduce necessary images recorded on the recording medium.

A further embodiment of this invention is arranged to reproduce by reproducing means a video signal recorded on a recording medium, to detect by motion detecting means a motion of the image reproduced by the reproducing means, and to control by control means an operation of the reproducing means according to a detection output of the motion detecting means. The arrangement enables the embodiment to simply and reliably reproduce necessary images recorded on the recording medium.

A further embodiment of this invention is arranged to compress by a compressing circuit a video signal according to a motion of an image based on the video signal before the video signal is recorded on a recording medium, to perform, at the time of reproduction, an expanding process by an expanding circuit on the video signal reproduced from the recording medium, to detect by motion detecting means a motion of the image on the basis of the video signal, to operate switching means to supply the video signal to the motion detection means at the time of recording and to supply the video signal expanded by the expanding circuit to the motion detecting means at the time of reproduction, and to control by control means a reproduction mode according to a detection output of the motion detecting means. The arrangement enables the embodiment to simply and reliably reproduce necessary images from the recording medium.

A further embodiment of this invention is arranged to pickup by image pickup means an image of an object of shooting, to detect by motion detecting means a motion of the object image and to control by control means the image pickup means according to a detection output of the motion detecting means. The arrangement enables the embodiment to simply and reliably pickup the images of necessary objects.

A still further embodiment of this invention is arranged to convert by image pickup means an image of an object into a video signal, to record the video signal outputted from the image pickup means on a recording medium by recording means, to re produce by reproducing means the video signal recorded on the recording medium by the recording means, to detect by first motion detecting means a motion of the object image picked up by the image pickup means, to detect by second motion detecting means a motion of an image reproduced by the reproducing means, and to control by control means the image pickup means or the recording means according to a detection output of the first motion detecting means and the reproducing means according to a detection output of the second motion detecting means. The arrangement enables the embodiment to simply and reliably record any video signal that must be recorded and to simply and reliably reproduce any video signal that must be reproduced.

Other objects and features of this invention will become apparent from the following detailed description of embodiments thereof taken in connection with the accompanying drawings.

DETAILED DESCRIPTION OF THE PREFERRED EMBODIMENTS

The following describes a first embodiment of this invention. In the case of the first embodiment, this invention is applied to a VTR which is constantly directed to an object of shooting and waits for opportunities of shooting in a state of being secured to a tripod or the like, such as in the case of a watch video system fixed on the porch of a family residence.

Figure 1:
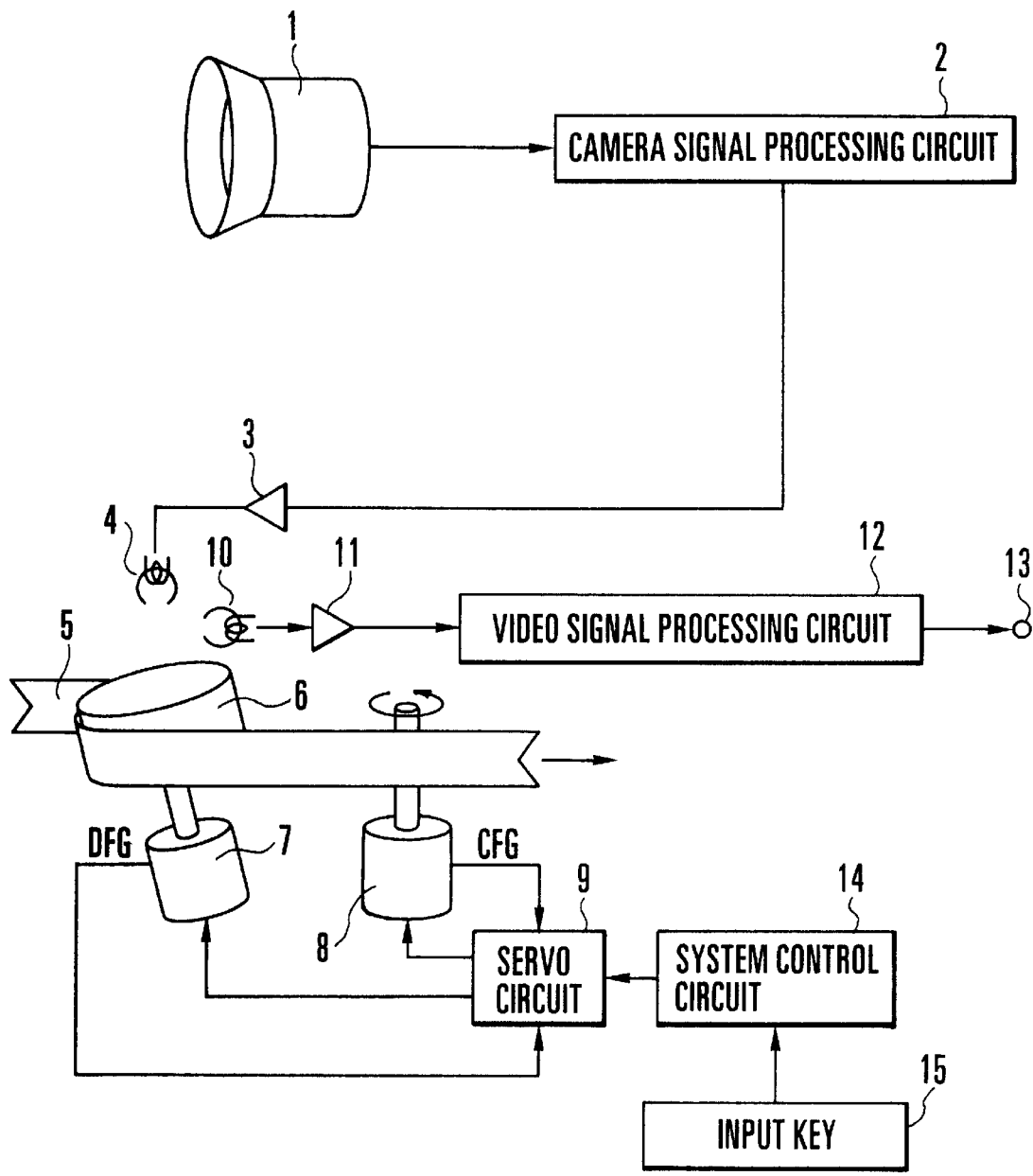
FIG. 1 shows the arrangement of the conventional recording and reproducing apparatus.
Figure 2:
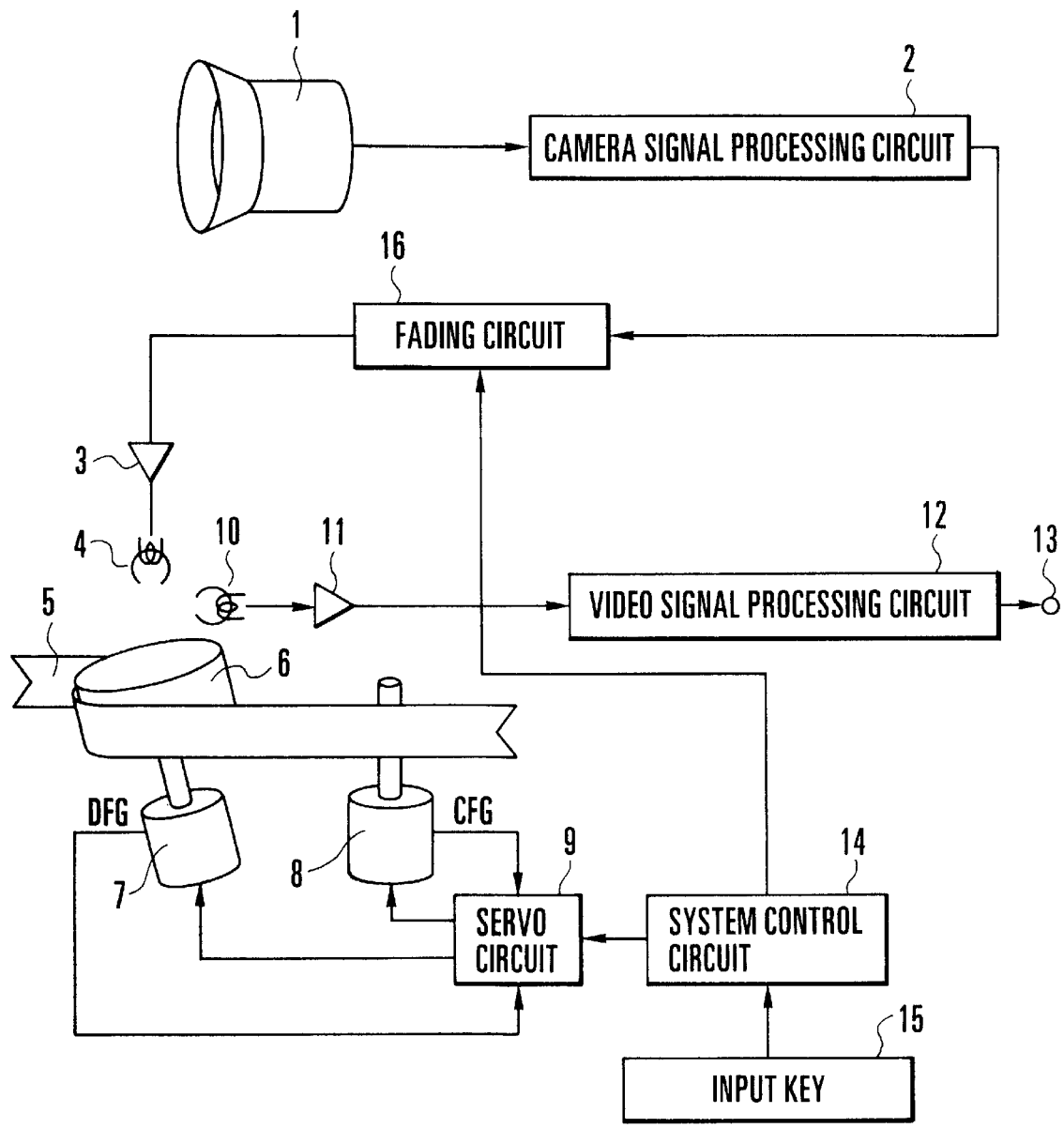
FIG. 2 shows another example of arrangement of the conventional recording and reproducing apparatus.
Figure 3:
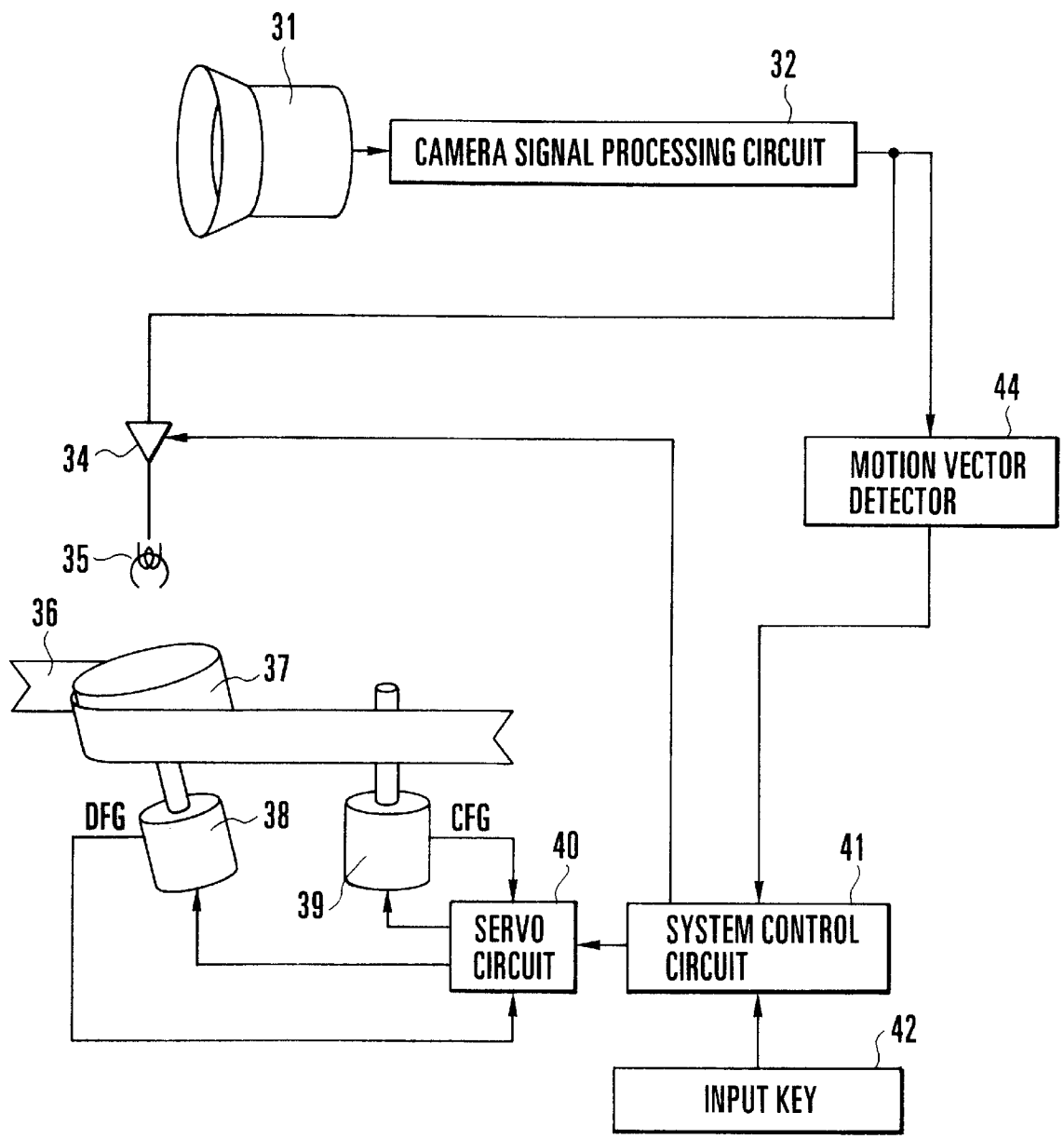
FIG. 3 shows the arrangement of a first embodiment of this invention.

FIG. 3 shows in a block diagram a recording system of the VTR arranged as the first embodiment of this invention. Referring to FIG. 3, a motion vector detector 44 is arranged to detect a motion vector of a video image outputted from a camera signal processing circuit 32 and to send the motion vector to a system control circuit 41.

The operation of the first embodiment which is arranged as described above is described below with reference to FIG. 4 which is a flow chart.

A video image picked up by a video camera 31 is outputted in the form of an electrical signal. The camera signal processing circuit 32 obtains luminance information and chrominance information from the electrical signal and carries out various processes on the electrical signal, including a gamma correction process, a blanking process, a process of adding synchronizing signals, etc., to form a video signal. The video signal is supplied to a head amplifier (recording amplifier) 34 which is arranged to perform recording signal processing actions and to the motion vector detector 44. The head amplifier 34 performs various processes necessary for recording on a magnetic tape, including conversion to a low-band, modulation, etc. The motion vector detector 44 is arranged to detect the vector of any motion taking place in each of predetermined areas within the image plane of the input video signal. For this purpose, the motion vector detector 44 obtains a difference arising between a video signal of the current field and a video signal of an immediately preceding field within the predetermined area. The video image is considered to be moving in the direction in which a correlation between the current and preceding video signals becomes larger on the basis of the value of the difference detected. Any motion of the video image within the predetermined area is expressed by the size and phase of the vector. Normally, the motion vector detecting action is performed for several parts of the image plane to obtain a plurality of motion vectors. Then, a representative motion vector is computed by carrying out averaging and centroid-computing operations on the plurality of motion vectors. The representative motion vector is considered to be a final motion vector. The output of the motion vector detector 44 is sent to the system control circuit 41.

Figure 4:
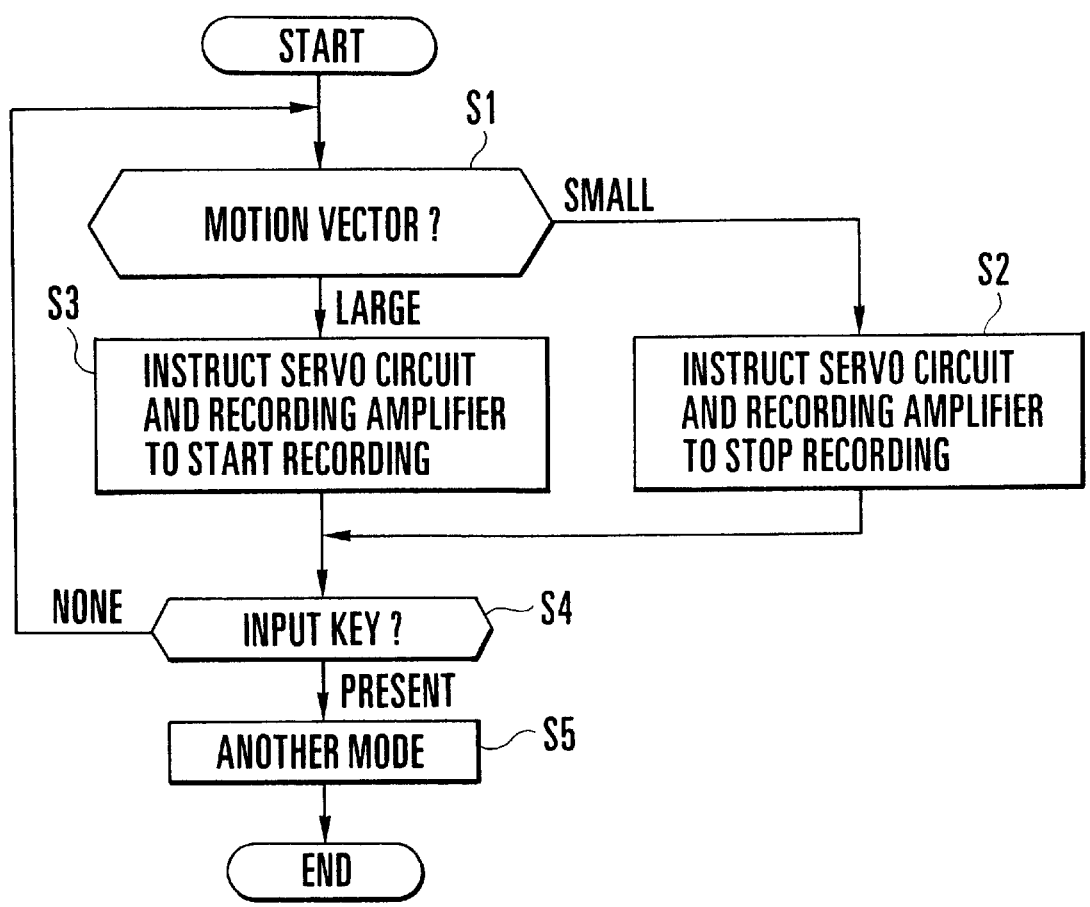
FIG. 4 is a flow chart showing the operation of the first embodiment of this invention.

An outside scene usually picked up shows no one at the porch. Under such a condition, the motion vector detector 44 supplies the system control circuit 41 with a motion vector which ideally shows "0 motion" and, in actuality, shows a very small value caused by a wind or the like. The system control circuit 41 then operates as follows. Referring to FIG. 4, at steps S1 and S2, if the information on the motion vector is at a value which is equal to or less than a threshold value, the system control circuit 41 instructs the servo circuit 40 and the head amplifier (recording amplifier) 34 to stop recording. No recording is performed under such a condition. This arrangement effectively prevents the recording tape from being wasted.

When some visitor comes and is picked up by the video camera 31, the motion vector detector 44 sends large motion vector information to the system control circuit 41 showing a great change occurring in the video image. At a step S3, the system control circuit 41 then instructs the servo circuit 40 and the head amplifier 34 (recording amplifier) to start their recording actions. The servo circuit 40 causes the drum motor 38 and the capstan motor 39 to rotate and measures their rotational frequencies through the drum FG (DFG) pulses and the capstan FG (CFG) pulses. The servo circuit 40 then controls the rotational frequency (rotation speed) of the drum motor 38 and that of the capstan motor 39 according to the DFG and CFG pulses. The video signal has its level adjusted by the head amplifier 34 and is processed in the manner as described in the foregoing. The video signal processed is recorded in a predetermined format on the magnetic tape 36 by a recording head 35 which is mounted a rotary drum 37.

When the visitor goes away, the motion of the video image on the image plane disappears to make the value of the output of the motion vector detector 44 smaller. The system control circuit 41 then instructs the servo circuit 40 and the head amplifier 34 to bring their recording actions to a stop. The recording and stopping actions are repeated in the above-stated manner. The actions of the steps S1, S2 and S3 continue until an input key for a mode other than a recording mode is found to have been pushed at the step S4. With the key for a mode other than the recording mode found to have been pushed at the step S4, the flow of operation comes to a step S5 to execute some process that corresponds to the operation mode designated by that key.

In the case of the first embodiment described above, the video system is provided for watching a porch and is thus arranged to use the motion vectors of the whole video image picked up. In a case where a video system is arranged for watching some other object, such as an express highway, on the other hand, the video image is as a whole always varying because of incessant traffic of motor vehicles. However, changes seldom take place in a roadside area of the express highway. In view of this, a second embodiment of this invention is arranged to perform shooting and stopping operations by using motion vector information corresponding only to motions taking place in a specific area of the scene, such as a roadside area.

Figure 5:
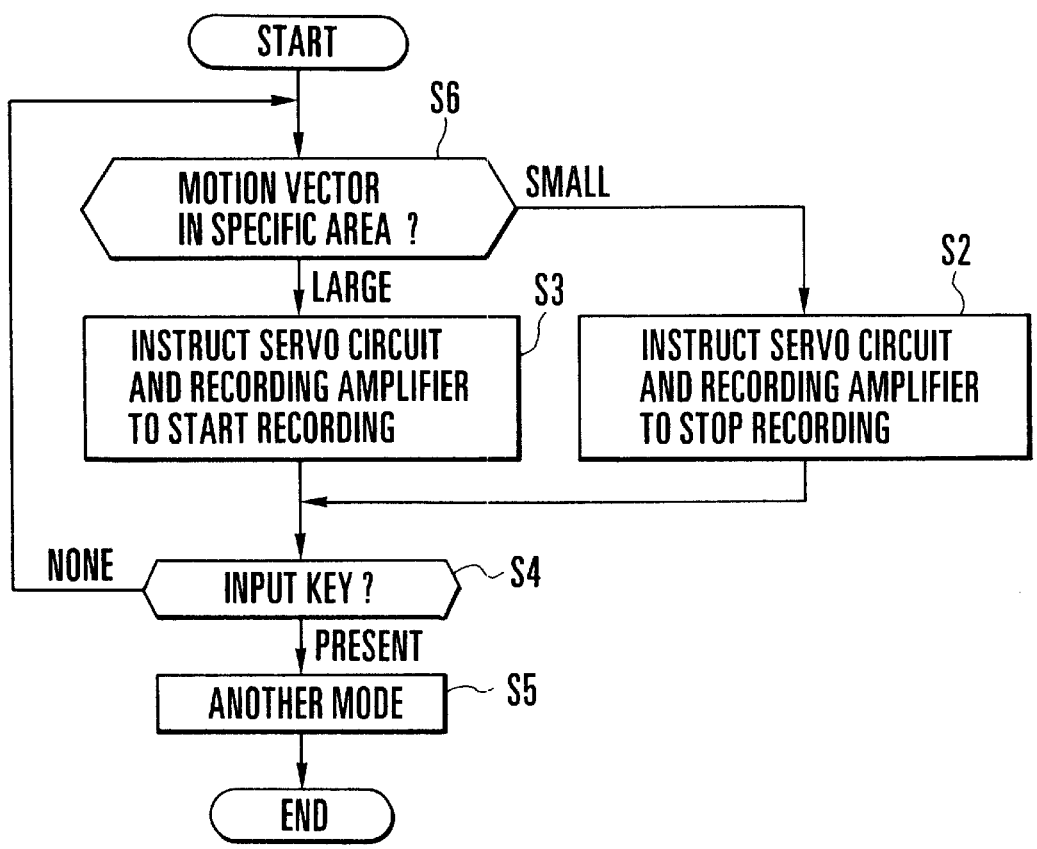
FIG. 5 is a flow chart showing the operation of a second embodiment of this invention.

In the case of the second embodiment, this invention is applied to a video system to be used, for example, for finding and shooting scenes of traffic accidents. The arrangement of the second embodiment is similar to that of the first embodiment. However, in the second embodiment, the system control circuit 41 operates as shown in FIG. 5 which is a flow chart. In FIG. 5, the step S1 is replaced with a step S6. At the step S6, a check is made for the size of the motion vector showing any motion taking place in a specific area within the image plane. The process of the step S2 or that of the step S3 described above is selected according to the size of the motion vector found by the step S6.

A third embodiment of this invention is not only arranged in the same manner as the first and second embodiments to change the operating mode according to the presence or absence of a motion vector but also arranged to operate to change the operating mode according to how the information on the motion vector has changed.

Figure 6:
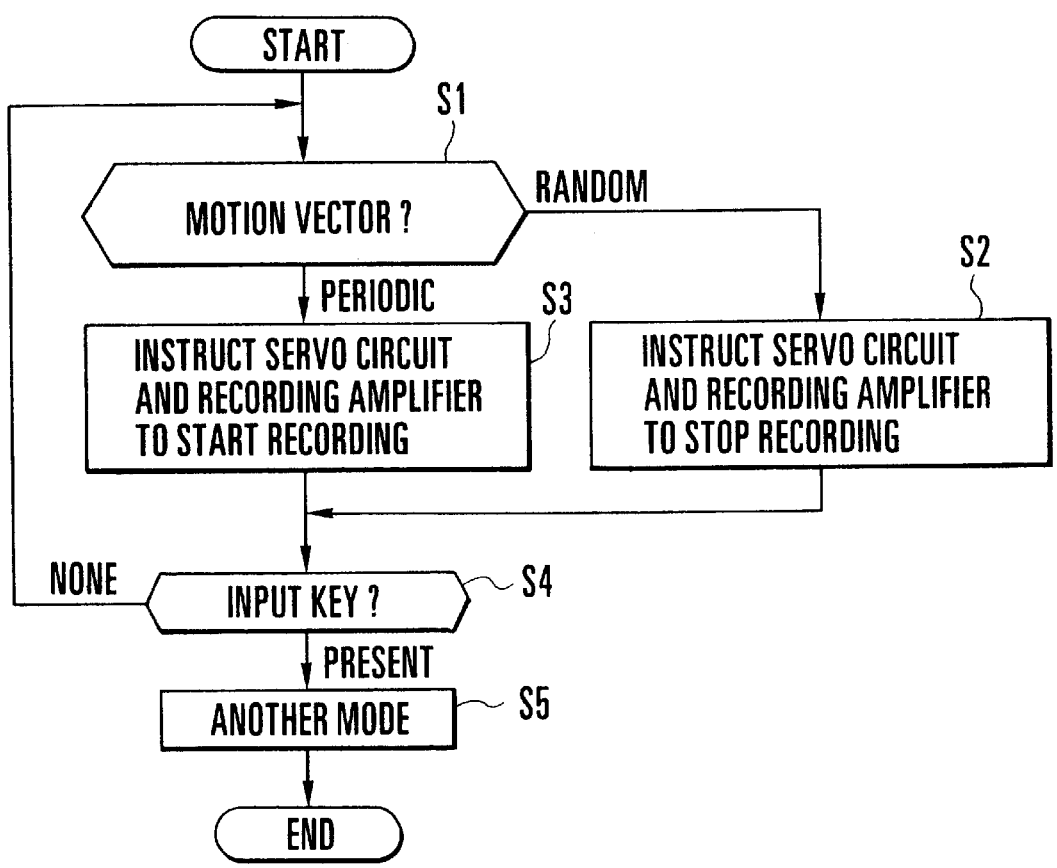
FIG. 6 is a flow chart showing the operation of a third embodiment of this invention.

For example, the operating mode is changed to the recording mode in cases where the motion vector information which has been varying at random at various points begins to vary either to a fixed phase or in a periodic manner. The arrangement of the third embodiment is applicable to monitoring an automation system of a plant. In the case of the third embodiment, the system control circuit 41 operates as shown in FIG. 6 which is a flow chart. Referring to FIG. 6, the process of the step S3 is executed when the motion vectors periodically vary between a plurality of fields. The process of the step S2 is executed when the motion vectors vary at random.

Figure 7:
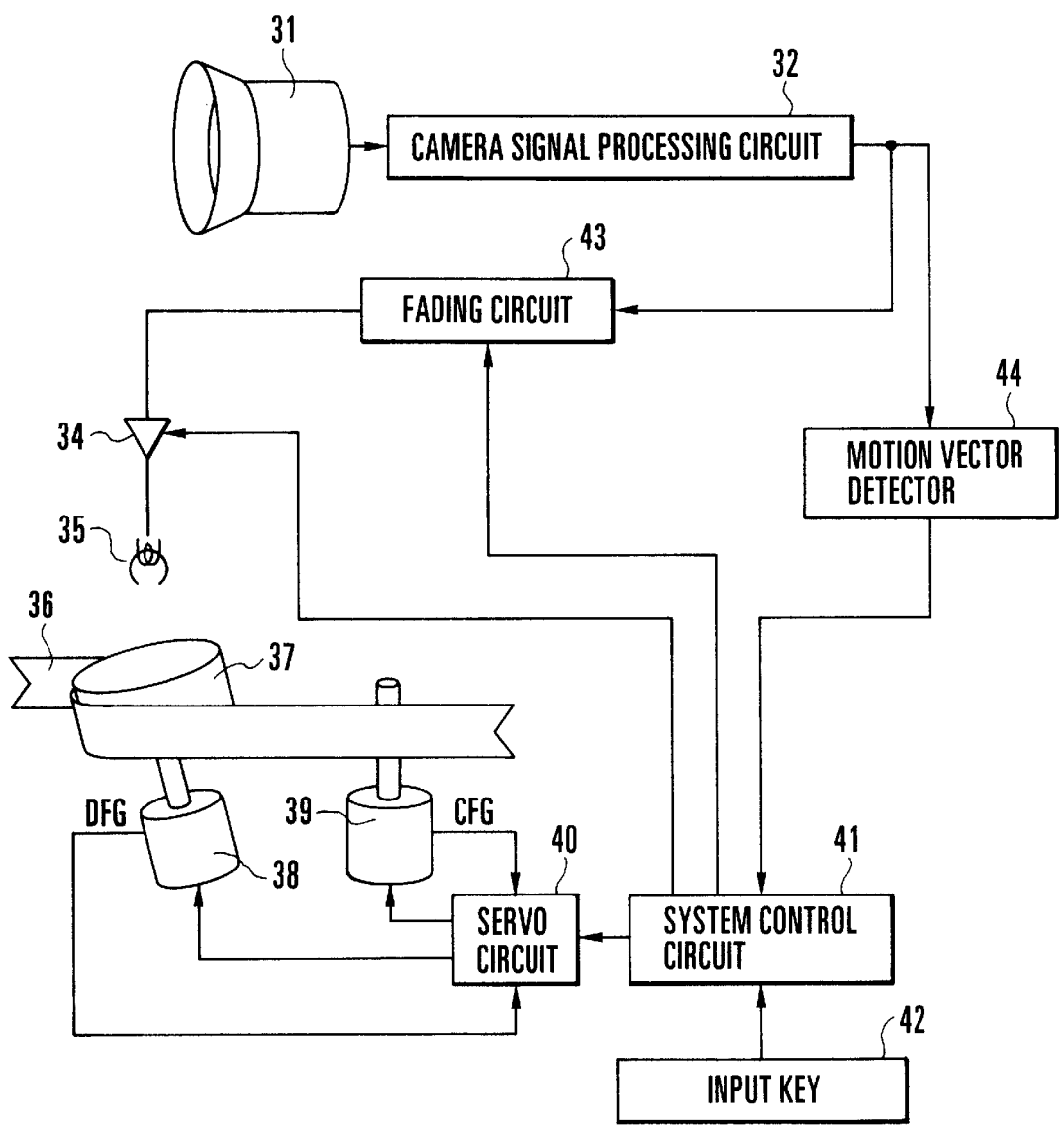
FIG. 7 shows the arrangement of a fourth embodiment of this invention.
Figure 8:
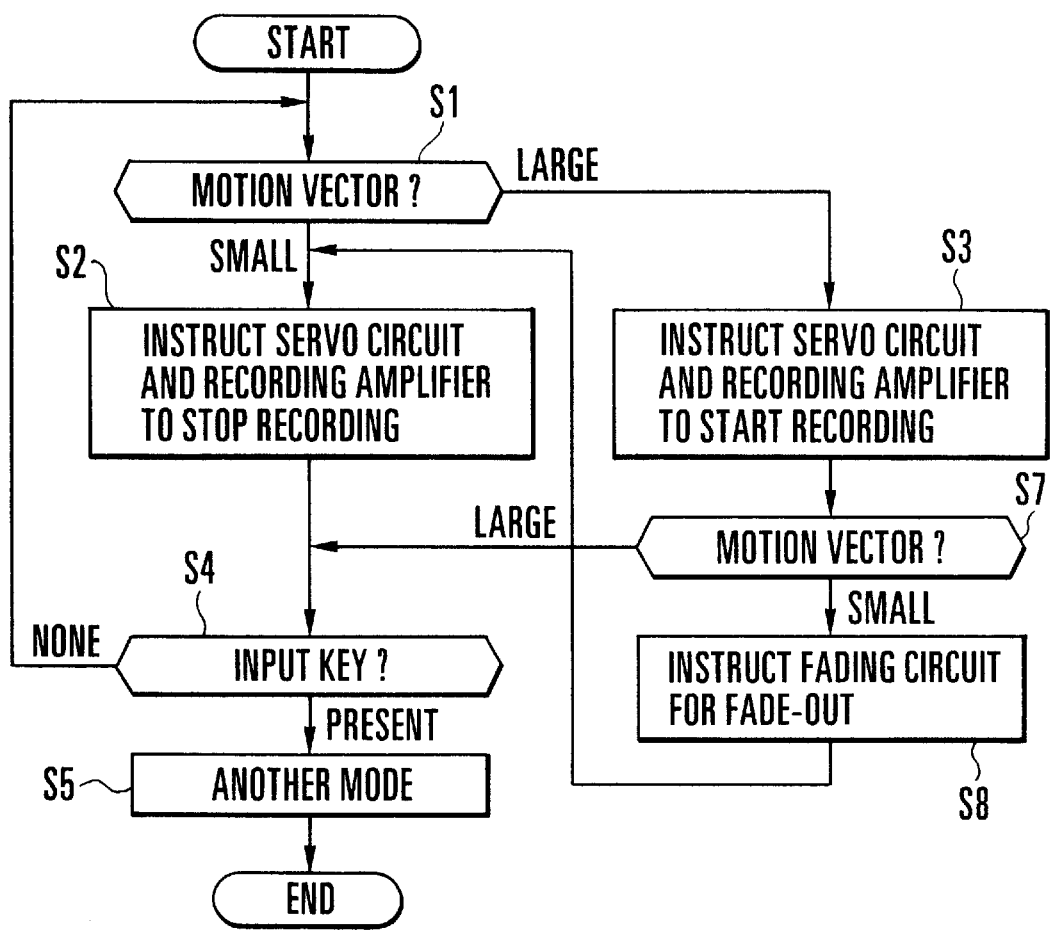
FIG. 8 is a flow chart showing the operation of the fourth embodiment of this invention.

FIG. 7 shows the arrangement of a fourth embodiment of this invention. The arrangement is similar to that of FIG. 3 except that the motion vector detector 44 is arranged in a VTR which is provided with a fading circuit 43. In the case of the fourth embodiment, the system control circuit 41 operates as described below with reference to FIG. 8 which is a flow chart.

A video signal outputted from the camera signal processing circuit 32, with luminance information and chrominance information having been formed by the camera signal processing circuit 32, is supplied to the fading circuit 43 and the motion vector detector 44. The output of the motion vector detector 44 is sent to the system control circuit 41. The VTR usually picks up only an outside scene with no one at the porch. In such a case, the motion vector detector 44 supplies a small value motion vector to the system control circuit 41. At steps S1, a check is made for the size of the motion vector information. If the motion vector information is found to be at a value equal to or less than a certain threshold value, like in the case of the above-stated condition, the flow comes to a step S2 to perform no recording.

When some visitor comes and is picked up by the VTR, the motion vector detector 44 sends a large motion vector information to the system control circuit 41. The flow then comes to a step S3. At the step S3, the system control circuit 41 instructs the servo circuit 40 and the recording amplifier 34 to begin their recording actions. The servo circuit 40 causes the drum motor 38 and the capstan motor 39 to rotate and controls them, according to the DFG and CFG pulses, to make them rotate at rotational frequencies desired for the recording mode. The video signal normally passes through the fading circuit 43 and, after that, comes to be recorded on the magnetic tape 36 through the head amplifier (recording amplifier) 34 and the recording head 35. At that time, the fading circuit 43 is inoperative and no fading process is performed.

When the visitor goes away, the output value of the motion vector detector 44 becomes small and a motion vector of a small value is supplied to the system control circuit 41. Then, at steps S7 and S8, the system control circuit 41 sends a fading instruction to the fading circuit 43. The fading circuit 43 then gradually converges the video signal into a predetermined value. The flow of operation of the system control circuit waits for the lapse of a period of time required before the output of the fading circuit 43 completely converges into the predetermined value. After the lapse of this period of time, the flow comes to the step S2. At the step S2, the system control circuit 41 instructs the servo circuit 40 and the recording amplifier 34 to stop performing their recording actions. The servo circuit 40 then brings the drum motor 38 and the capstan motor 39 to a stop. The recording action comes to an end in a fade-out manner. This flow of operation smoothly brings the image recording action to an end.

As described above, each of the embodiments is arranged to detect the motion of a video image on the basis of the video signal and to control the recording action according to information on the motion of the video image. The arrangement enables the embodiment to automatically start and stop shooting when some change takes place in the object of shooting to obviate the necessity of having the VTR always attended and operated by the operator. In the case of a watch video system, the video tape can be prevented from being wasted, so that the tape can be used over a long period of time. A further advantage of the embodiment lies in that, the VTR can be employed in a watch video system for a specific purpose by selecting a specific detecting area and by utilizing the characteristic of the motion vectors.

Further, some of the embodiments is arranged to detect the motion of a video image on the basis of the video signal and to control the fading action and the recording action according to information on the motion. The arrangement obviates the necessity of having the operator to stand by the VTR for pushing a fade key when the fading action must be performed.

Figure 9:
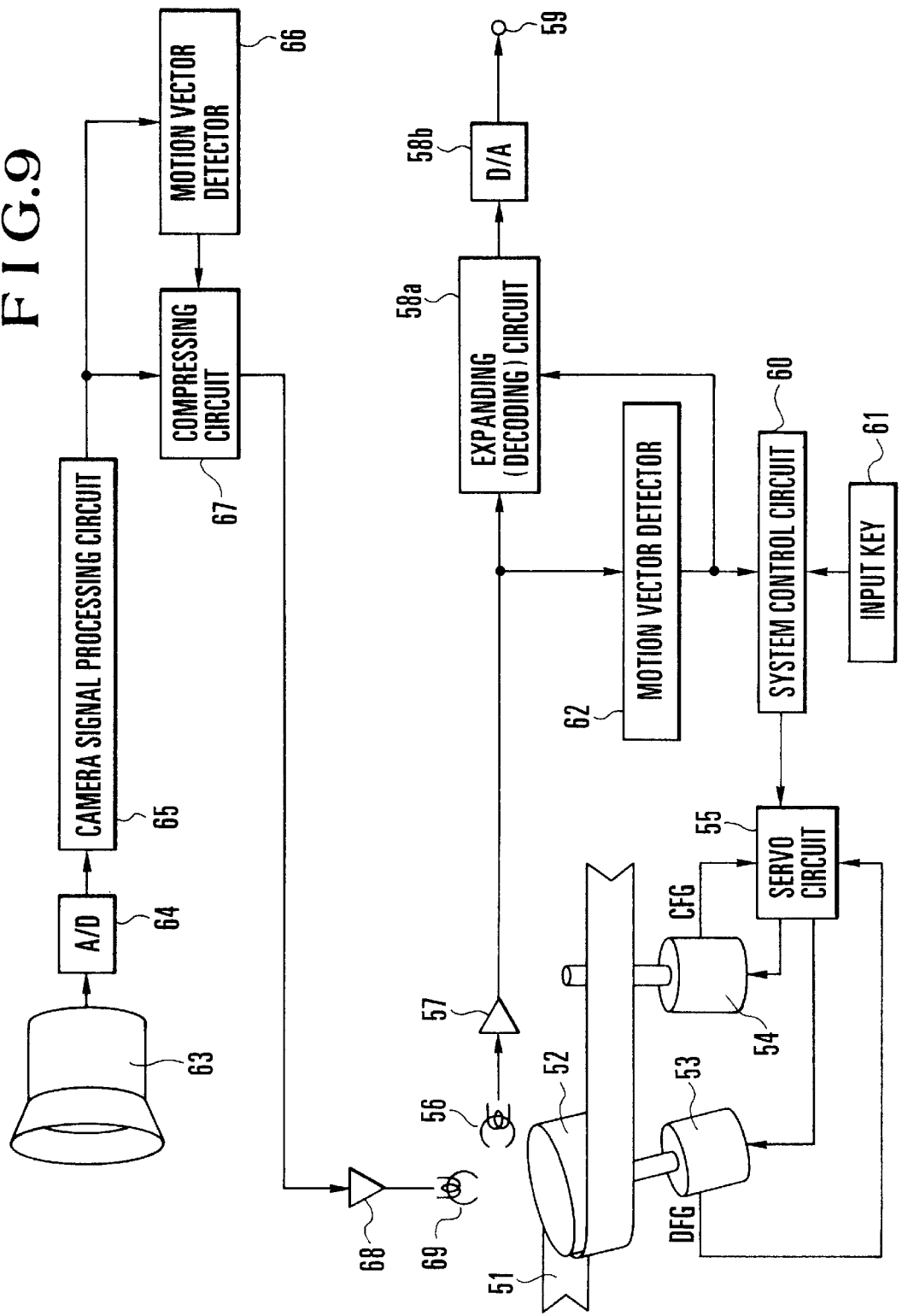
FIG. 9 shows the arrangement of a fifth embodiment of this invention.

FIG. 9 shows recording and reproducing systems of a camera-integrated type digital VTR which is arranged according to this invention as a fifth embodiment thereof.

The recording system of FIG. 9 includes a video camera 63, an analog-to-digital converter 64 (hereinafter referred to as A/D converter) which is arranged to convert the output of the video camera 63 into a digital signal, a camera signal processing circuit 65 which is arranged to process the digital signal outputted from the A/D converter 64, a motion vector detector 66 which is arranged to detect a motion vector indicating any motion or a change taking place between a signal processed by the camera signal processing circuit 65 for one field or frame and a signal processed by the camera signal processing circuit 65 for another field or frame, a compressing circuit 67 at which the signal processed by the camera signal processing circuit 65 is compressed by predicting a compensation for a motion according the motion vector, a recording amplifier 68 which is arranged to amplify the signal compressed, and a recording head 69 which is arranged to record the amplified signal on a magnetic tape 51 and to be substantially the same as a reproducing head 56 of the reproducing system.

Further, in the fifth embodiment, the motion vector detector 66 is arranged as follows: In compressing and encoding the image signal, a motion vector indicating any motion taking place between one field or frame image plane and another is detected for every one of predetermined blocks. A difference between images indicating occurrence of some motion is encoded in such a way as to reduce the amount of information to be encoded. The encoding efficiency is enhanced by virtue of the socalled motion compensating predictive encoding action.

The reproducing system of FIG. 9 includes an expanding (decoding) circuit 58a arranged to expand, or decode, a reproduced video signal which is obtained by the reproducing head 56 and processed by a reproduction amplifier 57 in a predetermined manner, a digital-to-analog (hereinafter referred to as D/A) converter 58b arranged to convert the decoded video signal into an analog signal and to supply it to a video output terminal 59, and a motion vector detector 62 arranged to detect motion vector information from the reproduced video signal and to supply the information to the expanding (decoding) circuit 58a and a system control circuit 60. Upon receipt of the motion vector information from the motion vector detector 62, the expanding (decoding) circuit 58a performs a decoding process to compensate for the motion on the basis of the motion vector information.

The operation of the fifth embodiment which is arranged as described above is described with reference to FIG. 10 which is a flow chart as follows.

At a step S21, a check is made to find if the VTR is in the recording mode. If so, the flow of operation comes to a step S22. At the step S22, a video image picked up by the video camera 63 is taken out in the form of an analog electrical signal. The analog signal is converted into a digital signal by the A/D converter 64. In the following description of the flow chart, a word "signal" means the digital signal.

The output of the A/D converter 64 is supplied to the camera signal processing circuit 65. The camera signal processing circuit 65 then processes the signal to form luminance information and chrominance information. As a result, the signal is outputted as a video signal. The video signal is supplied to the compressing circuit 67 and t he motion vector detector 66. The motion vector detector 66 detects a difference between the video signal currently inputted for a current field and a video signal previously inputted for an immediately preceding field for every one of blocks (areas) of the video image. A motion taking place in predetermined blocks within the video image is expressed on the basis of the value of the difference thus detected. The output of the motion vector detector 66 is supplied to the compressing circuit 67.

The compressing circuit 67 compresses a large amount of information included in the video signal to a small amount of information by using the vector. At the same time, the digital signal is frequency-modulated. The level of the signal is adjusted by the recording amplifier 68. The signal processed by the recording amplifier 68 is supplied to a recording head 69 mounted on a rotary drum 52. The recording head 69 records the signal on a magnetic tape 51 until the recording action comes to a stop at a next step S23.

At a step S24, the system control circuit 60 sends an instruction for a recording mode to a servo circuit 55. The servo circuit 55 causes a drum motor 53 and a capstan motor 54 to rotate and measures their rotational frequencies through DFG and CFG pulses. The servo circuit 55 thus performs control until a rotational frequency desired in the recording mode is attained. The signal is thus recording on the magnetic tape 51.

At the time of reproduction, the embodiment operates as follows. In a case where the video image recorded on the magnetic tape 51 has been picked up, for example, by a video system set to watch the porch of a family residence, a fast feeding reproducing action is automatically carried out until the tape 51 comes to its part where an image of a visitor is recorded on the tape 51.

At a step S25, the operator first pushes a reproduction key which is included in a input key part 61. At a step S26, the system control circuit 60 instructs the servo circuit 55 to act in a reproduction mode. The servo circuit 55 causes the drum motor 53 and the capstan motor 54 to rotate and measures their rotational frequencies through the DFG and CFG pulses. The servo circuit 55 thus performs control to obtain a rotational frequency desired in the reproduction mode. At this time, the signal which has been modulated and taken out by the reproducing head 56 mounted on the rotary drum 52 is amplified by the reproduction amplifier 57. The output of the amplifier 57 is supplied to the expanding (decoding) circuit 58a to be decoded back into the original video signal. The video signal is supplied to the D/A converter 58b to be converted back into the analog video signal. The analog video signal is supplied to a monitor through a video output terminal 59.

Meanwhile, the digital video signal is supplied also to the motion vector detector 62 at a step S27. The motion vector detector 62 sends information on the motion of the video image to the system control circuit 60. The motion vector detector 62 is arranged to act in the same manner as the motion vector detector 66 mentioned above.

At the beginning of reproduction, a record of an outside scene with nobody at the porch is played back. In this instance, the motion vector detector 62 supplies the system control circuit 60 with a motion vector which ideally shows no motion or, in actuality, shows only a small value of motion caused by a wind or the like. At the step S27, if the system control circuit 60 judges the motion vector to be at a value which is equal to or less than a threshold value, thus indicating substantially no motion, the flow of operation comes to a step S28. At the step S28, the system control circuit 60 instructs the servo circuit 55 to act in the reproduction mode. The servo circuit 55 then causes the drum motor 53 and the capstan motor 54 to rotate for fast feeding reproduction.

After that, when a part of the record of video images showing some visitor begins to be played back, the motion vector detector 62 sends to the system control circuit 60 motion vector information indicating that a large motion has occurred in a position other than the positions of noise bars generated by the fast feeding reproduction. With this information received, the flow of operation of FIG. 10 then comes from the step S27 to a step S29. At the step S29, the system control circuit 60 instructs the servo circuit 55 to shift the fast feeding reproduction mode to a normal reproduction mode. The servo circuit 55 then controls the drum motor 53 and the capstan motor 54 in the normal reproduction mode.

When the image of the above-stated visitor disappears from the video image, the output of the motion vector detector 62 again outputs motion vector information indicating a motion close to a "zero motion". Therefore, the flow comes from the step S27 to the step S28 again to instruct the servo circuit 55 to act in the fast feeding reproduction mode. Then, these steps are repeated.

The actions of the steps from the step S26 through the step S29 are executed until some key other than the reproduction key is found at a step S30 to have been operated. With a key other than the reproduction key found at the step S25 or S30 to have been operated, the flow comes to a step S31 to have the applicable mode carried out.

The arrangement of the fifth embodiment has an advantage in that the reproduction time can be shortened. However, the arrangement necessitates the use of two motion vector detectors 62 and 66 and thus causes an increase in size and scale of the hardware. A sixth embodiment of this invention is, therefore, arranged to solve this point in the following manner.

Figure 11:
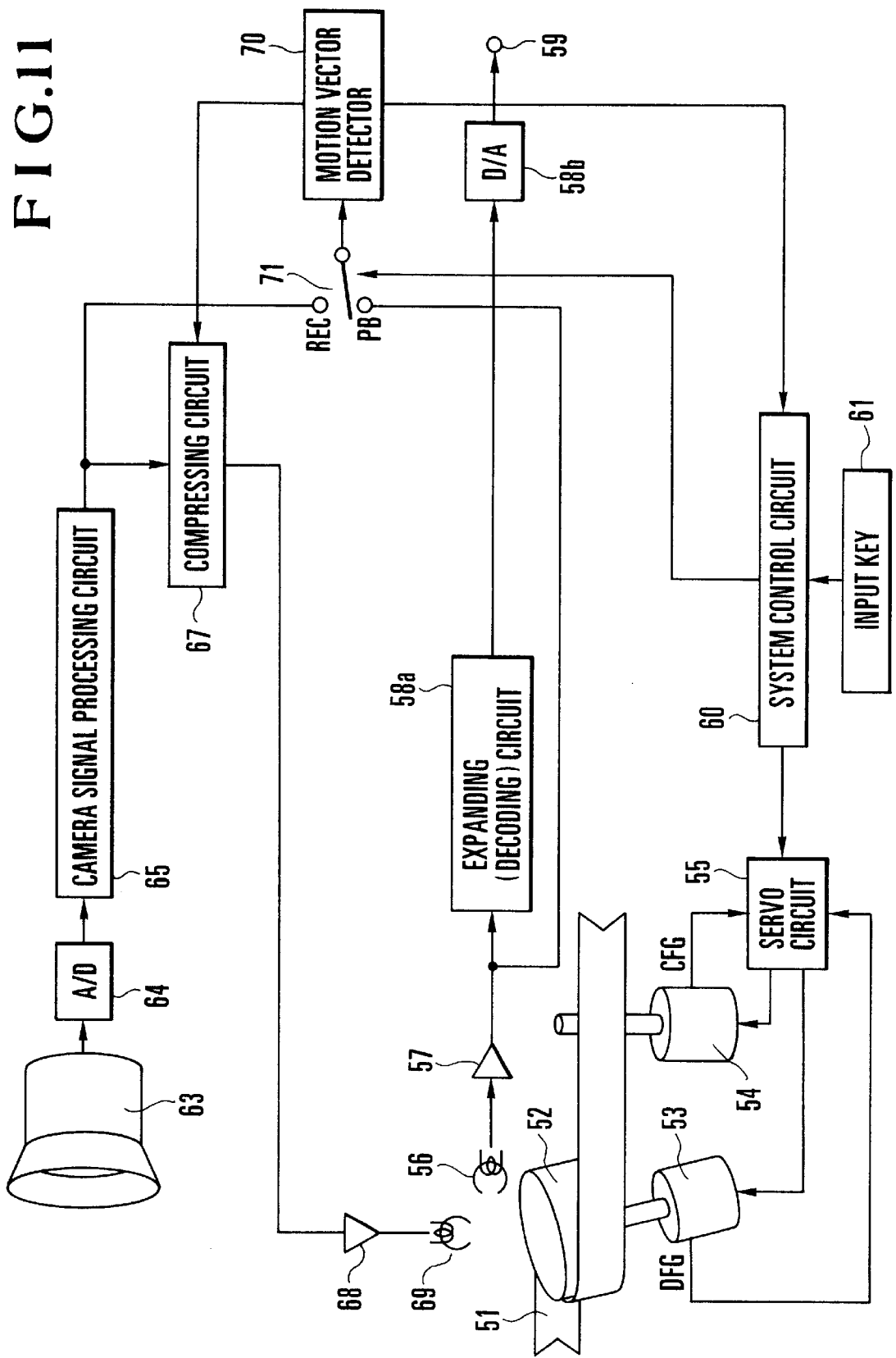
FIG. 11 shows the arrangement of a sixth embodiment of this invention.

FIG. 11 shows the arrangement of the sixth embodiment of this invention. In this case, a motion vector detector 70 is arranged to serve as both the motion vector detectors 62 and 66 of FIG. 9. A change-over switch 71 is arranged to connect the motion vector detector 70 to the camera signal processing circuit 65 in recording and to the expanding (decoding) circuit 58a in reproducing. The switching action of the change-over switch 71 is controlled by the system control circuit 60 according to the operation of the input key part 61. The vector detecting method of the motion vector detector 70 varies with the selection of the recording mode or the reproduction mode. The details of the method are the same as the method described in the foregoing.

Figure 12:
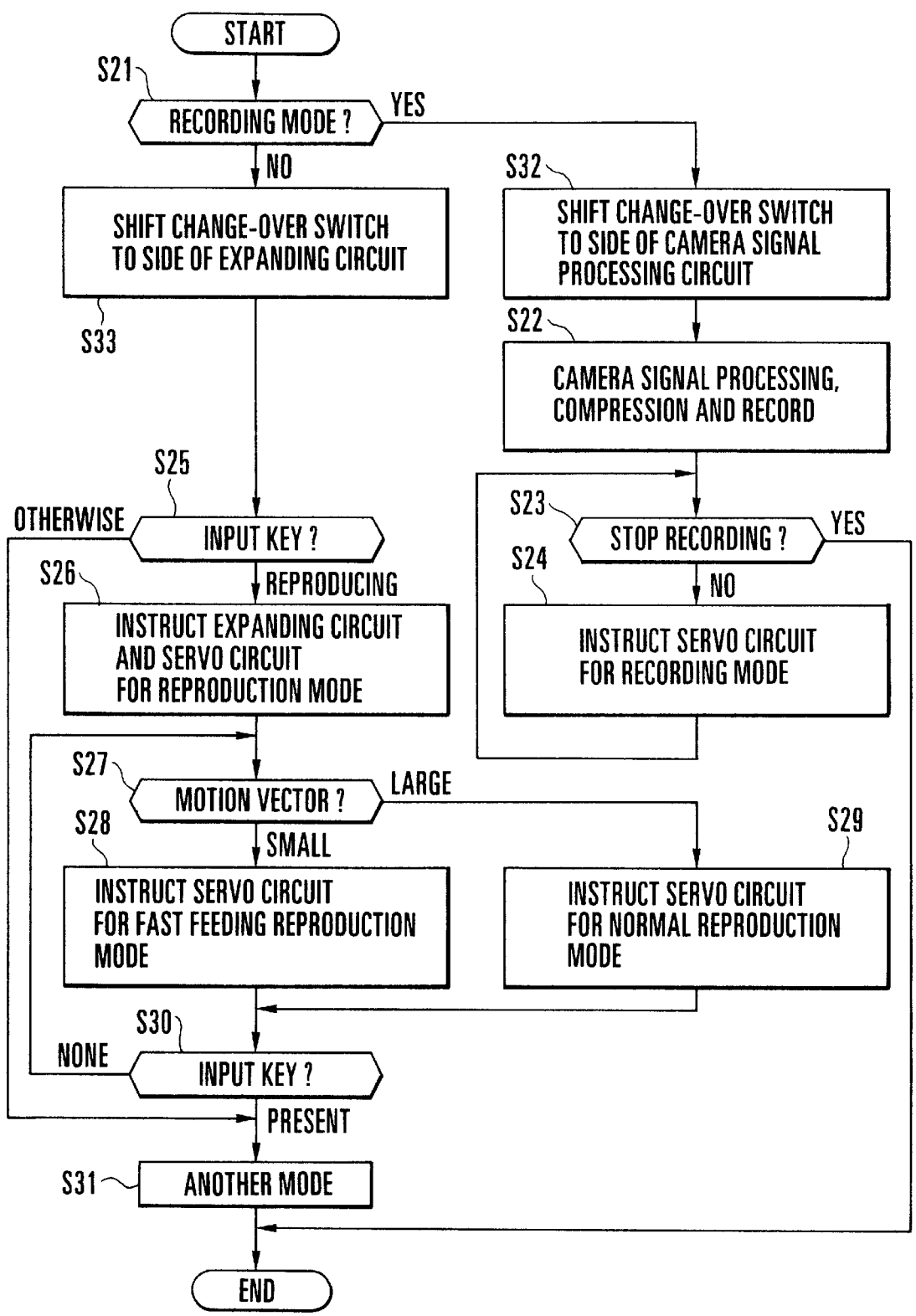
FIG. 12 is a flow chart showing the operation of the sixth embodiment of this invention.

FIG. 12 shows in a flow chart the operation of the sixth embodiment. Steps S21 to S31 of FIG. 12 are executed in the same manner as those of FIG. 10 which shows the operation of the fifth embodiment. The operation of the sixth embodiment differs from that of the fifth embodiment only in that a step S32 or S33 is added to be executed next to the step S21.

More specifically, in the recording mode, the steps S22 to S24 are executed after the change-over switch 71 is connected to the camera signal processing circuit 65 at the step S32. In any mode other than the recording mode, the flow comes from the step S21 to the step S33 to connect the change-over switch 71 to the expanding (decoding) circuit 58a and, after that, the step S25 and steps subsequent to the step S25 are executed.

Each of the fifth and sixth embodiments has been described by way of example as being used for reproducing a video image obtained by a watch video system. It is, however, possible to automatically switch the normal reproduction mode over to the fast feeding reproduction mode also in cases where video images replete with similar and boring scenes like in the case of a lengthy video record of a journey. Video images recorded by interval recording only for each predetermined intermittent period of several seconds can be reproduced also in the same manner.

Figure 13:
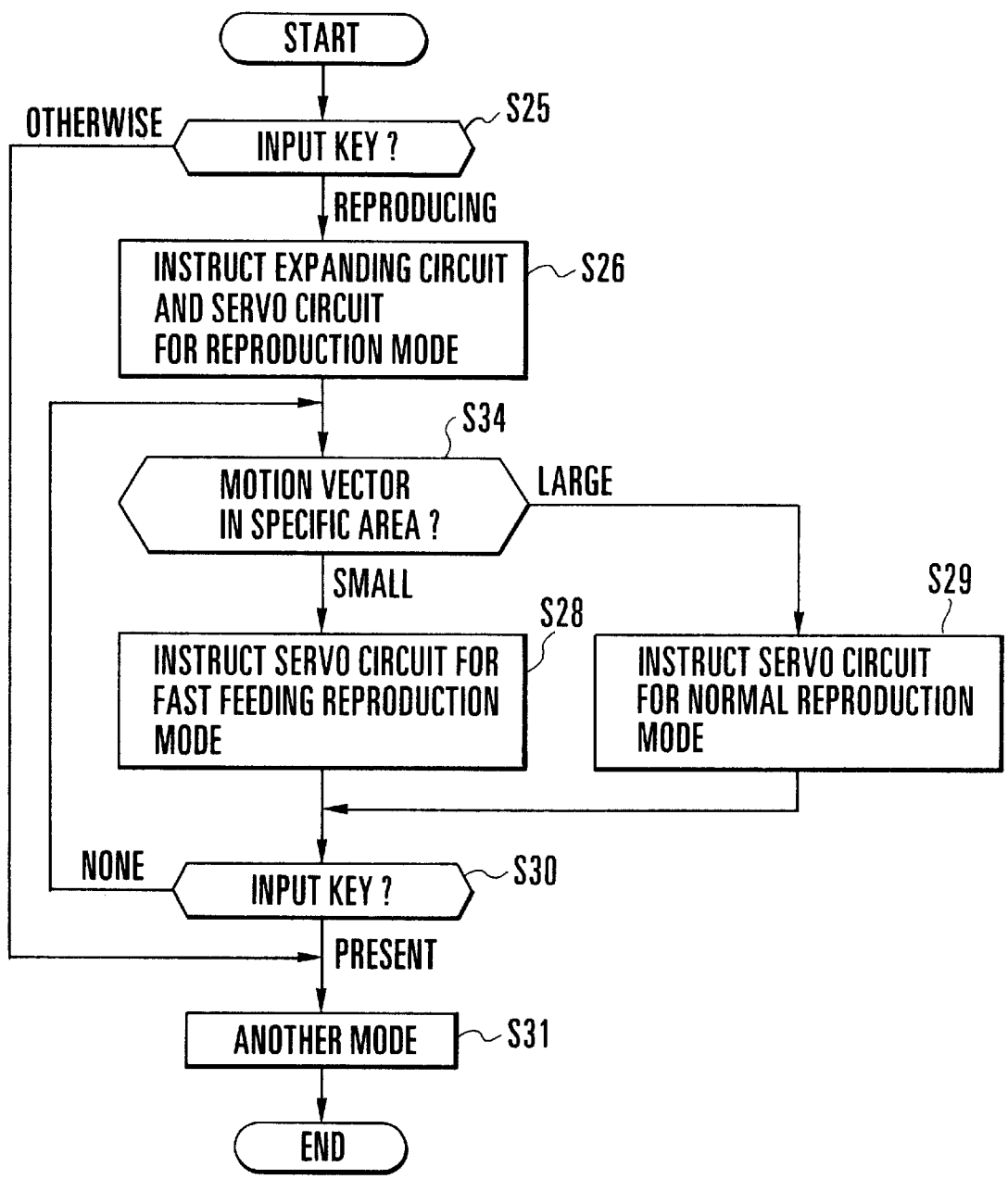
FIG. 13 is a flow chart showing the operation of a seventh embodiment of this invention.

Further, in reproducing video images obtained by a watch video system or some other video system which is arranged for frequently varying video images, it is possible to specify the range of a part of a video image, instead of removing only the positions of noise bars from the video image like in the case of the fifth or sixth embodiment, and to control the reproduction by using only the motion vector information on this specific part. A seventh embodiment of this invention is arranged to carry out reproduction in this manner. FIG. 13 shows in a flow chart the reproducing operation of the seventh embodiment.

Figure 10:
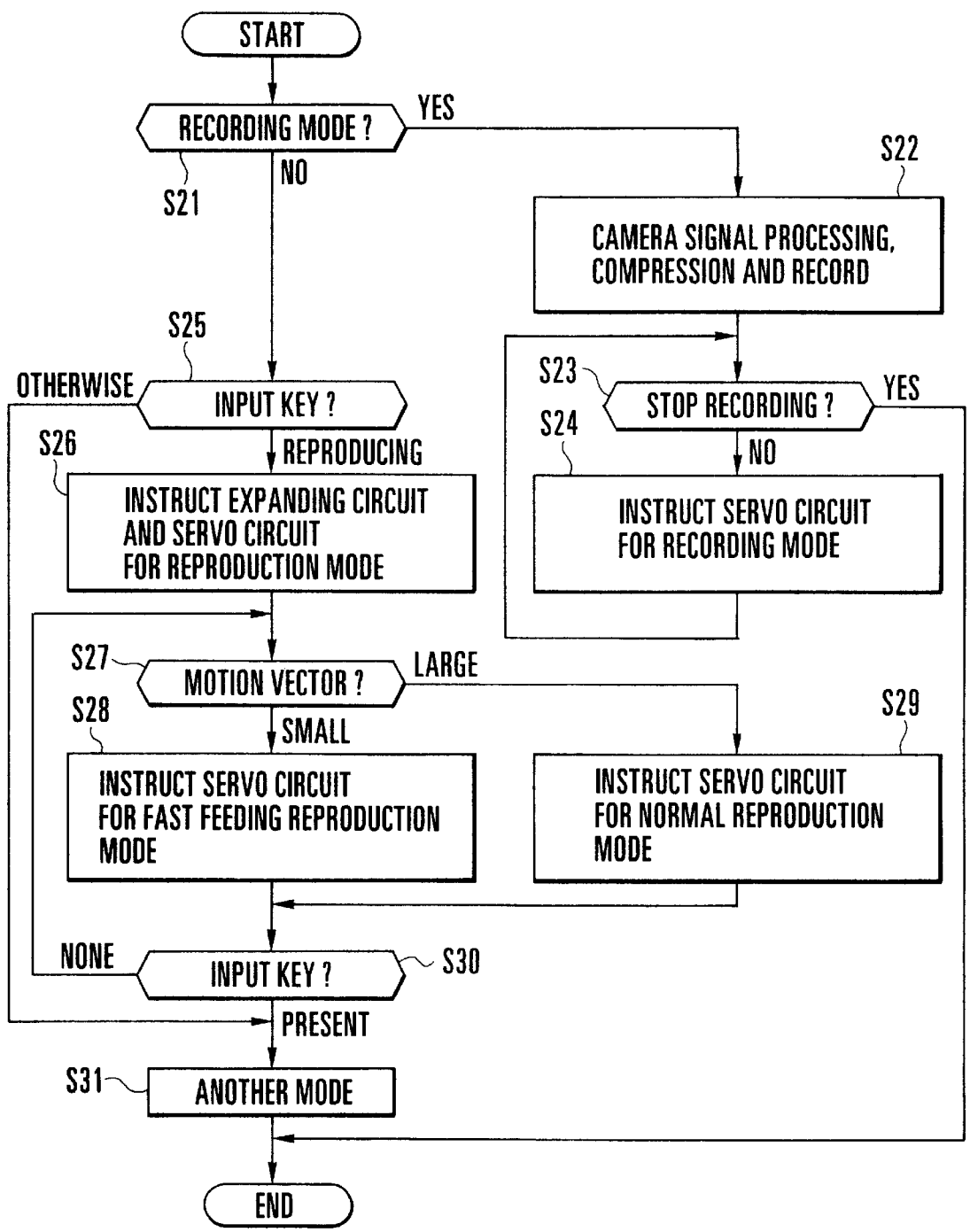
FIG. 10 is a flow chart showing the operation of the fifth embodiment of this invention.

In the case of FIG. 13, the step S27 of FIGS. 10 and 12 is replaced with a step S34. At the step S34, the step S28 or S29 is selected according to the size of the motion vector of the specific part of the video image.

While each of the fifth to seventh embodiments has been described with respect to how switching between the reproduction mode and the fast feeding reproduction mode is repeated, these modes can be switched over to some other special reproduction mode.

Figure 14:
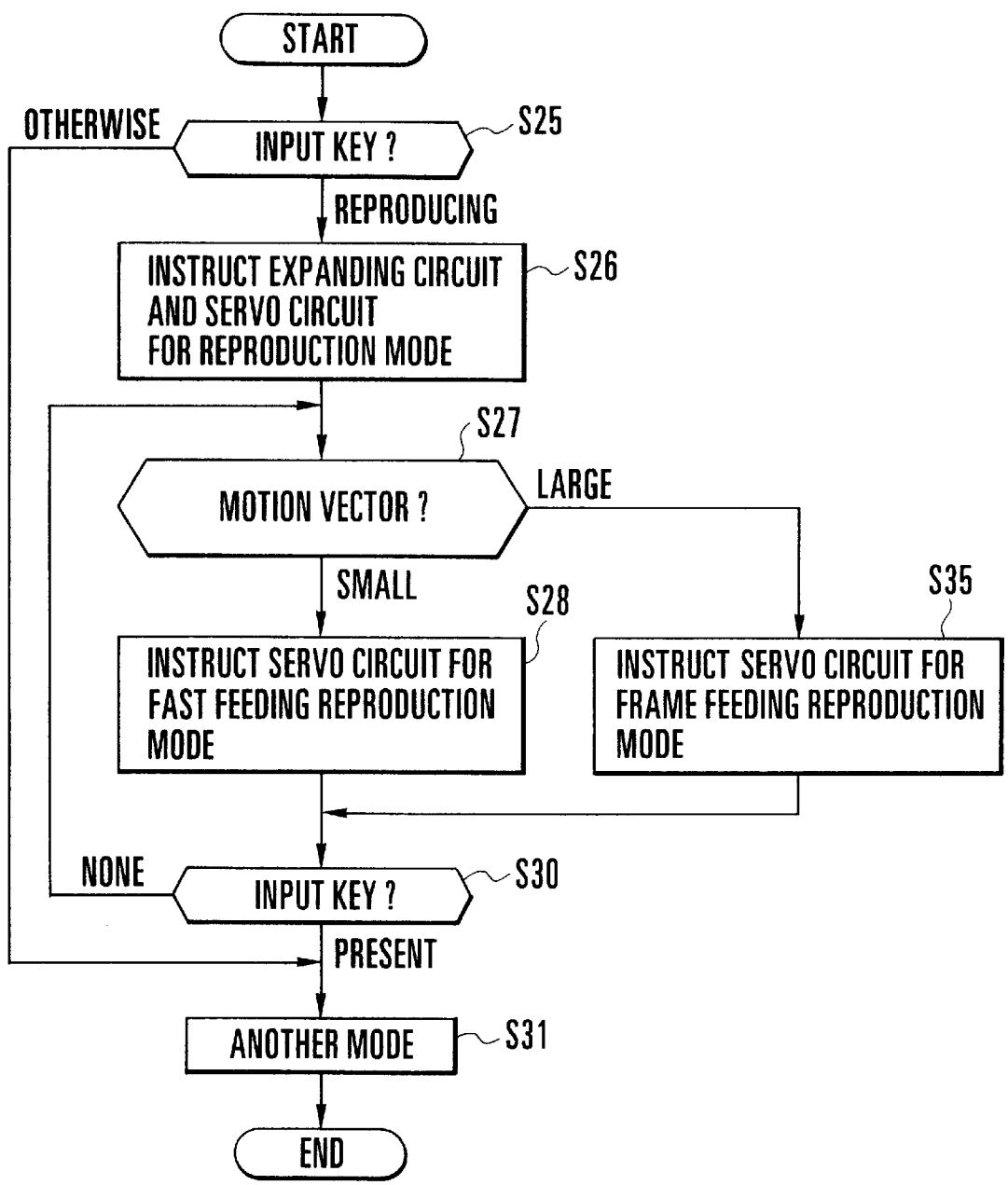
FIG. 14 is a flow chart showing the operation of an eighth embodiment of this invention.

For example, when some change is detected in the fast feeding reproduction mode, the mode can be shifted to a still image mode. Further the still image mode can be shifted to a frame feeding mode in which the tape is intermittently transported. An eighth embodiment of this invention is arranged to permit an operation in such a manner. FIG. 14 shows in a flow chart the operation of the eighth embodiment. In this case, if the motion vector is found to be large at the step S27, the flow of operation comes to a step S35 to issue an instruction for the frame feeding reproduction mode.

The fifth to eighth embodiments described above are arranged to switch one mode over to another according to the size of the motion vector information. In accordance with this invention, however, the mode can be switched not only according to the size of the motion vector information but also according to a manner in which the motion vector has changed.

Figure 15:
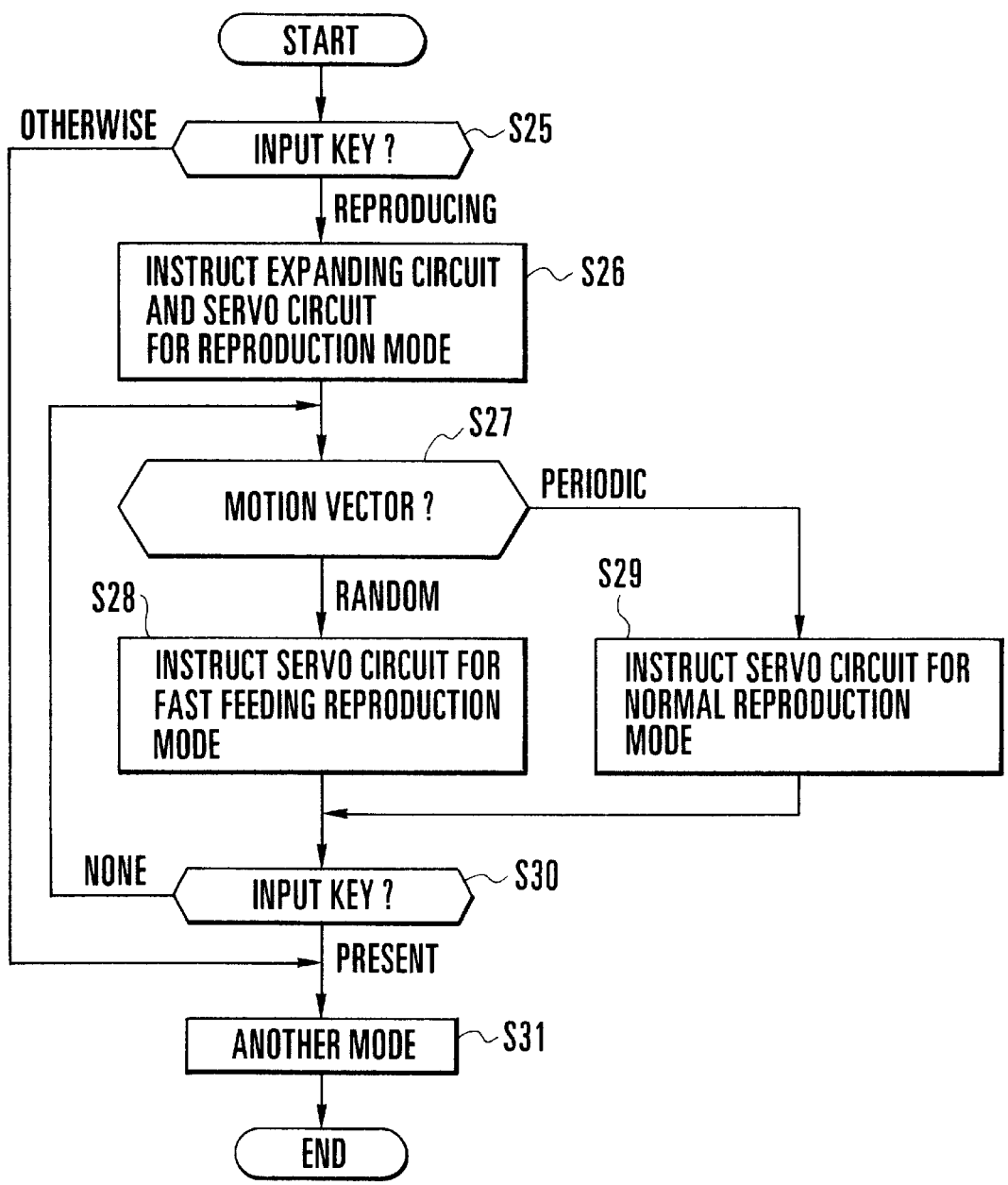
FIG. 15 is a flow chart showing the operation of a ninth embodiment of this invention.

For example, the reproduction mode can be switched when the motion vector information changes from a state of changing at random at various points either to a fixed phase or to a periodically changing state. A ninth embodiment of this invention is arranged to permit switching to be made in such a manner. FIG. 15 shows in a flow chart the operation of the ninth embodiment. In the case of FIG. 15, when the motion vector is found at the step S27 to be changing in a periodic manner, the flow of operation comes to execute the process of the step S29. If the motion vector is found to be changing at random, the process of the step S28 is executed.

The embodiments described above are arranged to detect the motion of the video image from the reproduced video signal and to control the reproduction mode according to the motion detected. The arrangement saves the operator from the trouble of repeating the same operation and also prevents a part of the video images from passing unnoticed by the operator due to a slow human reflex speed.

Further, according to the arrangement of the embodiments, one and the same motion detecting means can be used for both the recording system and the reproducing system by switching the use of it. This arrangement permits utilization of motion detecting means such as a motion vector detector which has conventionally been used for a recording system, so that the reproduction mode can be controlled without increasing the size of a necessary circuit arrangement.

What is claimed is:

1. A recording apparatus comprising:
   a) motion detecting means for detecting a motion of an image an the basis of a video signal and providing an output signal indicative of a level of the detected motion;
   b) comparator means for comparing the level indicated in said motion detecting means with a predetermined level of motion;
   c) fading means for gradually converging a portion of the video signal into a predetermined value;
   d) recording means for recording on a recording medium the video signal portion after the video signal portion has passed through said fading means; and
   e) control means for causing said recording means to start recording of the video signal in the state that the level of motion is detected by the comparator means to be higher than the predetermined level of motion and for causing said fading means to perform a fading action in the state that the level of motion is detected by the comparator means to be lower than the predetermined level of motion.

2. An apparatus according to claim 1, wherein said motion detecting means is arranged to detect a motion of a part of the image.

3. An apparatus according to claim 1, wherein said control means is arranged to control said recording means in the state that the image is detected by said motion detecting means as to have made a predetermined motion.

4. An apparatus according to claim 3, wherein said control means is arranged to render said recording means inoperative in the state that the output of said motion detecting means is equal to or less than a predetermined value and to render said recording means operative in the state that the output of said motion detecting means exceeds the predetermined value.

5. An apparatus according to claim 1, wherein said control means is arranged to render said recording means inoperative in the state that the output of said motion detecting means is equal to or less than said predetermined level and to render said recording means operative in the state that the output of said motion detecting means exceeds the predetermined level.

6. A video system comprising:
   a) image pickup means for converting an image of an object of shooting into a video signal;
   b) recording means for recording on a recording medium the video signal outputted from said image pickup means;
   c) reproducing means for reproducing the video signal recorded on the recording medium by said recording means;
   d) first motion detecting means for detecting a motion of the image of the object picked up by said image pickup means;
   e) second motion detecting means for detecting information on a motion of an image from a reproduced signal obtained by said reproducing means;
   f) first control means for causing said recording means to perform the recording operation in the state that the motion is detected by the first motion detecting means and not to perform the recording operation in the state that the motion is not detected by the first motion detecting means; and
   g) second control means for causing said reproducing means to reproduce the video signal in a normal reproduction mode in the state that the motion is detected by the second motion detecting means and to reproduce the video signal in a fast feeding reproduction mode in the state that the motion is not detected by the second motion detecting means.

7. A system according to claim 6, wherein said first motion detecting means is arranged to detect a motion of the image of a part of an image pickup area of said image pickup means.

8. A system according to claim 6, wherein said control means is arranged to control a processing of an output signal of said image pickup means when said first motion detecting means detects that the image of the object has made a predetermined motion.

9. A system according to claim 6, wherein said second motion detecting means is arranged to detect a motion of a part of the image recorded on the recording medium.

10. A system according to claim 6, wherein said control means is arranged to control said reproducing means in the state that said second motion detecting means detects that the image recorded on the recording medium has made a predetermined motion.

11. An apparatus according to claim 6, wherein said control means is arranged to control a speed of movement of said recording medium.

12. A system according to claim 6, further comprising compressing means for compressing the video signal, and expanding means for expanding the video signal compressed by said compressing means.

13. A system according to claim 6, wherein each of said first and second motion detecting means is arranged to obtain a difference between the video signal being processed for a current field and the video signal of a previous field immediately preceding the current field and to detect a motion vector expressing, by a size and phase thereof according to the difference, a motion of the image.

14. A video system method comprising the steps of:
   a) converting an image of an object of shooting into a video signal by means of image pickup means;
   b) recording on a recording medium the video signal outputted from said image pickup means by means of recording means;
   c) reproducing by means of reproducing means the video signal recorded on the recording medium by said recording means;
   d) detecting a motion of the image of the object picked up by said image pickup means by means of first motion detecting means;
   e) detecting information on a motion of an image from a reproduced signal obtained by said reproducing means by means of second motion detecting means;
   f) causing said recording means to perform the recording operation in the state that the motion is detected by the first motion detecting means and not to perform the recording operation in the state that the motion is not detected by the first motion detecting means; and
   g) causing said reproducing means to reproduce the video signal in a normal reproduction mode in the state that the motion is detected by the second motion detecting means and to reproduce the video signal in a fast feeding reproduction mode in the state that the motion is not detected by the second motion detecting means.

* * * * *

UNITED STATES PATENT AND TRADEMARK OFFICE
CERTIFICATE OF CORRECTION

PATENT NO. : 6,038,364
DATED : March 14, 2000
INVENTOR(S) : Shinichi Koyama, et al.

It is certified that error appears in the above-indentified patent and that said Letters Patent is hereby corrected as shown below:

Col. 1, line 55, delete "as follows:" and insert -- as follows. --.
Col. 4, line 66, delete "re produce" and insert -- reproduce --.
Col. 9, line 28, delete "socalled" and insert -- so-called --.
Col. 9, line 62, delete "t he" and insert -- the --.
Col. 12, lines 35-36, delete "th e" and insert -- the --.

Signed and Sealed this

Seventeenth Day of April, 2001

Attest:

NICHOLAS P. GODICI

*Attesting Officer*     *Acting Director of the United States Patent and Trademark Office*